INVENTOR.
Roy L. Anspach
BY Wood, Herron & Evans
ATTORNEYS

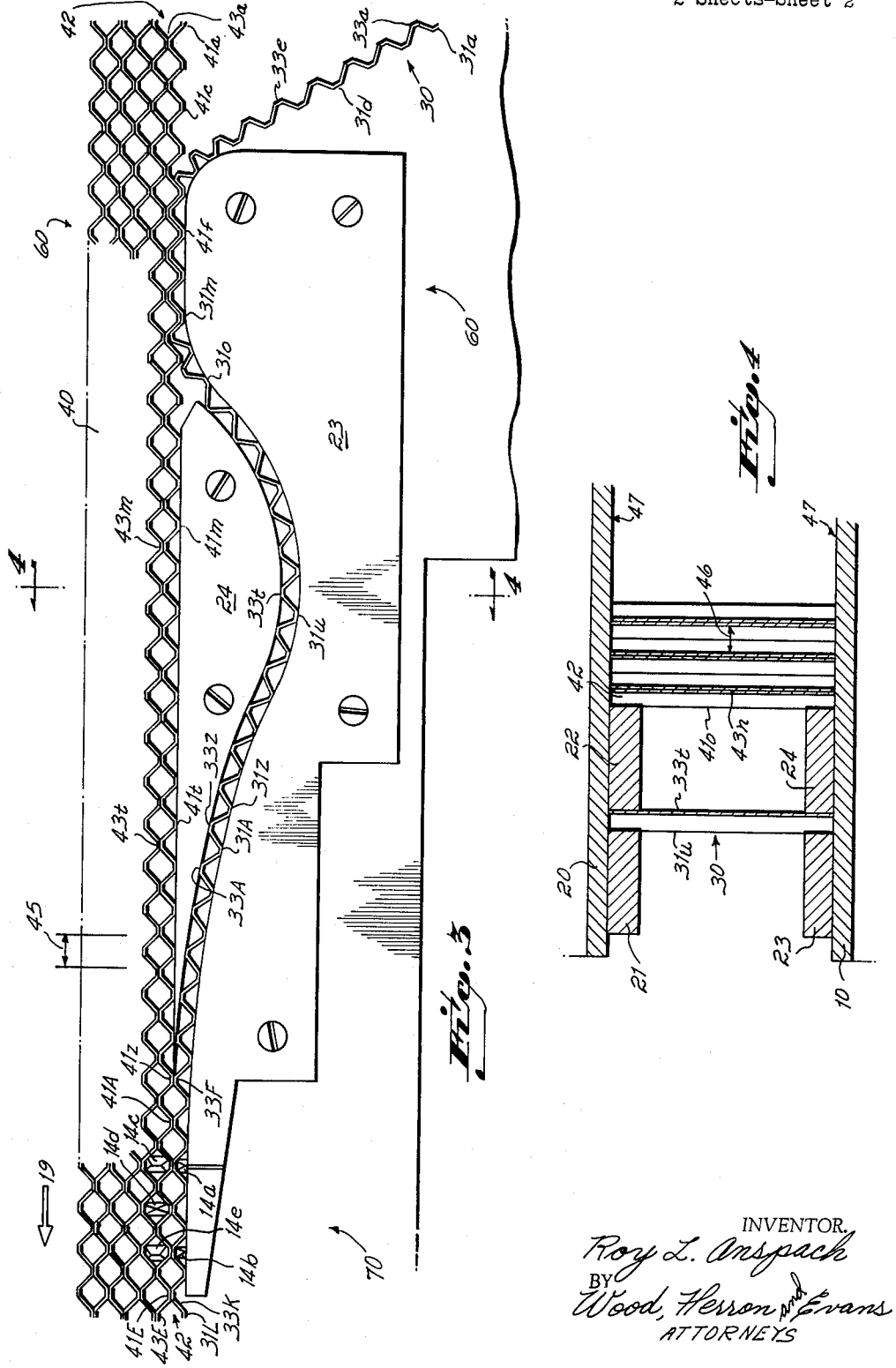

United States Patent Office 3,225,433
Patented Dec. 28, 1965

3,225,433
METHOD AND APPARATUS FOR INDEXING AND ASSEMBLING A CORE STRIP TO A HONEYCOMB CORE PANEL
Roy L. Anspach, Orange, Calif., assignor, by mesne assignments, to Aeronca Manufacturing Corporation, Middletown, Ohio
Filed Aug. 8, 1963, Ser. No. 300,818
9 Claims. (Cl. 29—429)

The present invention relates to a method and apparatus for assembling and manufacturing honeycomb structures, and more specifically, for indexing the longitudinal position of a honeycomb core strip prior to its attachment to a previously formed honeycomb core panel.

When an elongated, transversely corrugated member is subjected to longitudinal tension it is, by virtue of its corrugations, relatively easy to stretch from its initial configuration, with the amount of stretching that occurs being determined primarily by the amount of tensile stress that is applied and by the inherent characteristics of the material. When such a member is to be stretched to a precisely predetermined degree there is a difficult control problem presented, particularly if the control is to be carried out in conjunction with a continuous type of manufacturing process.

In a broad theoretical sense the present invention relates to a method and apparatus for attaching an elongated, transversely corrugated member in precise longitudinal alignment relationship to a structure that also has transverse corrugations therein, capable of being either engaged or not engaged by the corrugations of the elongated member. In a more specific sense the only presently known field of application for the invention is in the manufacture of honeycomb structures wherein a previously formed honeycomb core panel has an outer most core strip layer with exposed transverse corrugations therein; a new preformed, transversely corrugated core strip is to be attached thereto in precise longitudinal alignment relationship therewith; and the process employed is continuous in the sense that successive portions of the as yet unattached core strip are to be attached to the core panel in a uniform, repetitive fashion, by automatic machinery rather than by hand operation.

In the art of manufacturing steel honeycomb core structures it has become a well established procedure to utilize preformed, transversely corrugated core strips in which the longitudinal spacing of the corrugations is approximately equal to the cell length that is desired for the completed honeycomb structure. It has been the uniform practice to make the preformed core strip or ribbon with a corrugation spacing or cell length that is a little bit shorter than is desired in the completed honeycomb structure. Then, in conjunction with the process of attaching the ribbon or core strip to the previously formed honeycomb panel, the ribbon or strip is stretched a small amount so that the longitudinal spacing of its corrugations (its longitudinal cell length) will precisely correspond to that of the completed honeycomb panel to which it is being attached. In this respect the present invention makes no departure from the procedures which have heretofore been established, but simply provides a more effective means for carrying them out.

It may be noted as a matter of interest that in the conventional manufacture of steel honeycomb structures the stretching of the preformed ribbon does not result in a latent stressed condition of the completed honeycomb, for the reason that the usual procedure is to attach each ribbon to the panel by means of welding. The application of heat and pressure during the welding process effectively relieves the internal stress resulting from the stretching of the material, and the ribbon then assumes its new alignment as a portion of the completed honeycomb structure in an unstressed condition.

One established manufacturing procedure for making steel honeycomb structures has been to form the core panel in a flat configuration, attaching one new preformed ribbon at a time to the longitudinal side edge of the panel. Another established process has been the continuous circulating loop process, wherein the honeycomb core panel has been formed with sufficient length so that it can be made into a continuous loop and processed continuously through a forming machine as a new preformed strip is continuously attached on one longitudinal side edge of the core panel. It is in this latter process where the difficulty of adjusting the tension on the preformed ribbon as it is being attached, and of securing a precise longitudinal alignment between the ribbon being attached and the panel, has been particularly acute. Since the preformed ribbon that is being attached to the panel is generally wound upon the roll, and the size of the roll diminishes as the ribbon is taken from it, the stretching action of the ribbon has therefore been continuously affected as a function of the remaining size of the supply roll. Furthermore, the stretching action has also been affected by variations in the material of the ribbon itself, in the ambient temperature, in the precise operating characteristics of the machine in which the preformed ribbon was formed, and numerous other factors both known and unknown.

So in the prior art procedure for manufacturing steel honeycomb core by the continuous circulating loop process the difficulties of adjusting the tensioning and alignment of the preformed ribbon as it is being attached to the previously formed honeycomb core panel have been extreme. Various tension control devices have been used to establish proper alignment prior to pickup of the ribbon by the welding fingers, but none with satisfactory results. It has been necessary to keep an operator on duty for the purpose of continuously monitoring the precision of alignment being achieved, and adjusting the action of the tension control device from time to time, but even so, occasional misalignment has occurred with the result that the automatic welding apparatus for attaching the preformed ribbon to the panel has jammed, necessitating the complete shut-down of the operation as well as cutting into the previously formed honeycomb core panel and patching it up by methods that are both time consuming and expensive as well as failing to produce a completely satisfactory end product.

The main object and purpose of the present invention, therefore, is to provide a novel and superior method of indexing or aligning a preformed core ribbon as it is being attached to a previously formed honeycomb core panel.

An additional object of the invention is to provide such a method which is applicable to the continuous loop process of manufacturing steel honeycomb core structures.

A further object of the invention is to provide a simple, inexpensive, and reliable apparatus for carrying out the foregoing methods.

In the forming of a honeycomb structure the preformed ribbon is aligned and attached in what may be described as an out-of-phase relationship with the last core strip layer of the panel. That is, the transverse corrugations in the preformed ribbon provide a continuous series of alternately oppositely facing half-cells, and when the new ribbon is attached to the panel it is attached in a phase relationship such that its inwardly facing half-cells become cooperatively associated with respective outwardly facing half-cells of the last ribbon layer on the panel.

According to the present invention the final alignment position assumed by the newly attached ribbon is the same as it always has been. However, as an additional step of the process, the ribbon is first brought into engagement with the previously formed panel in an in-phase relationship to the last core strip layer thereof. In this preliminary alignment position the in-phase or nested relationship of the as yet unattached core strip permits it to be driven longitudinally in response to the longitudinal movement of the honeycomb core panel.

Since the phase relationship used in accordance with the present invention in the preliminary alignment position is the exact opposite of what is ultimately desired in the final alignment position, provision must be made thereafter for changing the phase relationship. The as yet unattached portion of the preformed ribbon is therefore guided out of its first engagement with the honeycomb core panel, and along a path of controlled length until it again engages the core panel in the final alignment position. Specifically, the controlled path through which the preformed ribbon then moves exceeds the length of the associated outer core strip layer of the honeycomb panel by an odd number of half-lengths of a cell.

The significance of the present invention is briefly as follows. First, the preliminary alignment position is a precise alignment position in which precision is achieved, not by virtue of apparatus used in carrying out the manufacturing process, but by virtue of the geometrical configuration of the parts that are being assembled. It is the juxtaposition of these parts which establishes the precise alignment of their longitudinal positions relative to each other. Thereafter, as the preformed ribbon moves out of engagement with the core panel, the necessity arises for controlling the tension and the stretching of this as yet unattached portion of the preformed ribbon; however, in this area the tensile stress to which the unattached ribbon is subjected is no longer affected by, or a function of, the tensile stress that exists in the ribbon portion extending between the preliminary alignment position and the supply roll or other source from which the preformed ribbon is being obtained.

The nature, objects and advantages of the invention will be more fully understood from the following description considered in conjunction with the accompanying drawings, wherein:

FIGURE 3 is a horizontal cross-sectional view of the apparatus showing both the preliminary and final alignment positions provided in accordance with the present invention; and FIGURE 4 is a vertical cross-sectional view taken on the line 4—4 of FIGURE 3.

Figure 1:
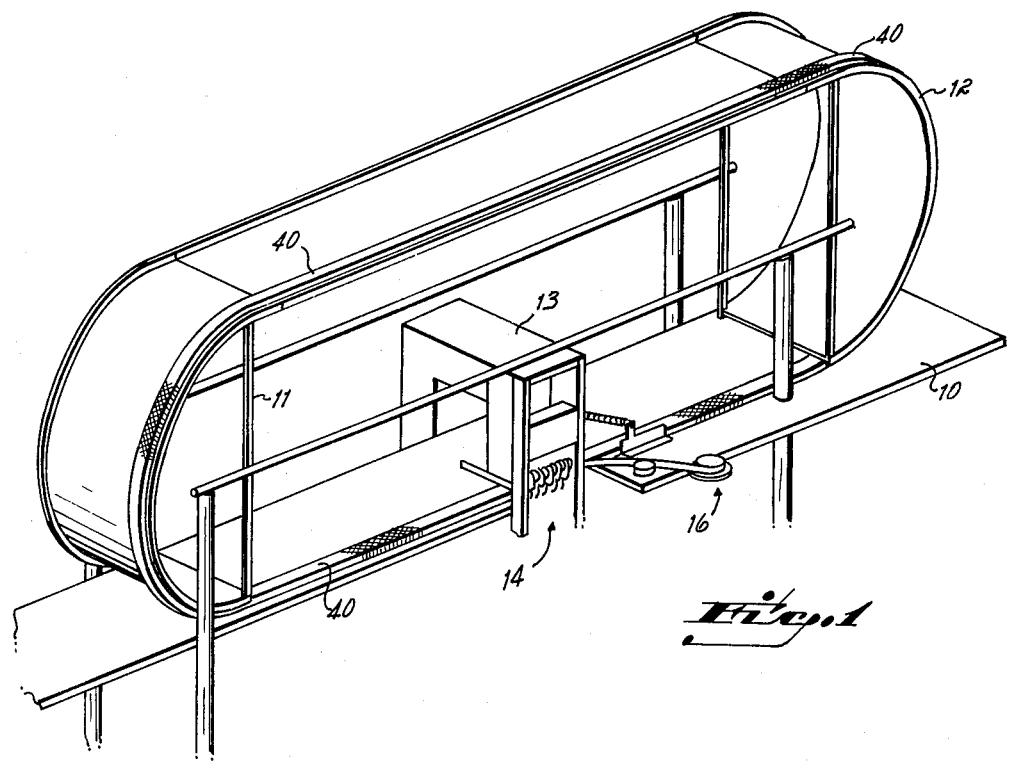
FIGURE 1 is a perspective view of an apparatus suitable for carrying out the present invention.
Figure 2:
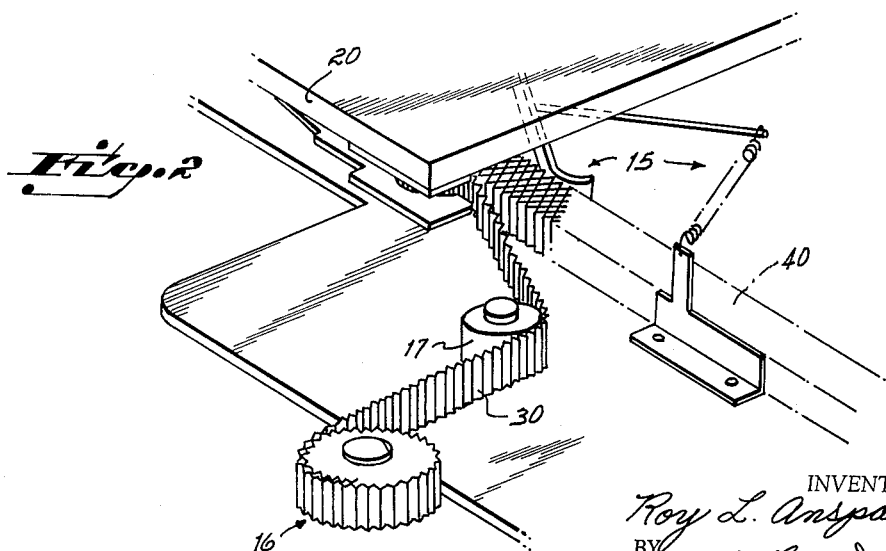
FIGURE 2 is a perspective view of a portion of the apparatus of FIGURE 1, showing the preformed honeycomb core strip being led to its preliminary alignment position.

With reference to the drawings, a table 10 has supported above it a loop guide frame 11 which in turn carries a loop guide 12. An auxiliary frame 13 associated with the table 10 carries welding and stepping apparatus generally designated as 14.

A previously formed honeycomb core panel 40 is in sliding engagement with the top of table 10 with the cells of the honeycomb extending vertically. The honeycomb panel 40 is in the form of a complete loop and extends in a vertical plane around the entire circumference of the loop guide 12. A continuous preformed honeycomb core strip or ribbon 30 is brought from a supply roll 16 past a guide roll 17 and into attachable relationship to the honeycomb core panel 40. As the width of the honeycomb panel grows due to the continuing attachment of the strip 30 thereto, a lateral positioning device 15 assures that the outermost strip layer of the honeycomb core is always in a fixed horizontal relationship relative to the welding and stepping apparatus 14.

The welding and stepping apparatus 14 may be entirely conventional or it may be of the specific form shown in my copending United States patent application Serial No. 201,139, filed June 8, 1962. The main function and purpose of the welding and stepping apparatus is to permanently secure successive portions of the strip 30 to the honeycomb panel 40, as such successive portions are brought into the desired final alignment position relative to the previously formed core panel. In the particular illustration the core strip 30 is made of stainless steel; the securing or attaching is done by means of welding; the welding in turn is accomplished by a plurality of welding wheels which move along a fixed vertical axis; and the apparatus is therefore constructed in such manner that while the welding wheels are making their vertical traverse of the entire vertical length of the core cells, so as to secure adjacent nodal portions of the core strip 30 and the last layer of the core panel 40 together, the entire honeycomb core panel is held in a stationary position relative to the table 10. As the welding at a particular stationary position is completed the honeycomb core panel 40 and the associated strip 30 are advanced to the left as shown by arrow 19 in FIGURE 3, and then upon arriving at a new static position are held in place while the welding wheels again make their necessary vertical run. In this connection it will be understood that with reference to FIGURE 3 the welding wheels 14a and 14b, and the welding fingers 14c, 14d, 14e, may be either entirely conventional in their structure and operation or may be in accordance with my above referenced copending application.

In any event it is to be clearly understood that the specific method of attaching the core strip 30 to the honeycomb core panel 40, whether by welding or otherwise, is not a part of the present invention, and that the present invention is concerned only with the method of and apparatus for aligning or indexing the core strip 30 in a longitudinal direction relative to the core panel 40, prior to its permanent attachment thereto. And while the method and apparatus as presently illustrated herein show the honeycomb core panel 40 in the form of a complete circulating loop structure, such illustration is made only because that is the technique which is presently preferred in the manufacture of stainless steel honeycomb structures; and in accordance with the invention the method of indexing or aligning the core strip 30 prior to its attachment may be utilized whether or not the completed honeycomb core panel is in the form of a complete circulating loop.

As best shown in FIGURE 3 the core strip 30 is moved first into engagement with the core panel 40 at a preliminary alignment position 60; then out of engagement with the core panel; and then back again into engagement with the core panel at a final alignment position 70. It will be noted that the honeycomb core strip 30 of the usual form having transverse corrugations such as to provide a continuing series of half-cells of which alternate ones face in opposite directions. In the completed honeycomb core panel the cells are approximately hexagonal but more specifically are of a square configuration with one opposite pair of the corners being flattened to permit the attachment of the nodal areas of the adjacent core strips in the honeycomb core panel to each other.

In the completed honeycomb core panel the height of each cell is indicated at 47 in FIGURE 4; the width of each cell is indicated at 46 in FIGURE 4; and the cell length is indicated at 45 in FIGURE 3. It is worthy of note that the length of a full cell is the same as the length of a half-cell; that is, since the half cells extend lengthwise of the core strip 30, and the completed cell is formed by placing two half-cells side by side, the length of each such half-cell measured longitudinally of the core strip 30 is the same as the length of a full cell as indicated at 45 in the completed honeycomb panel 40. Due to stretching of the unattached core strip the cell length thereof is, however, subject to some variation, as will be described.

As shown in FIGURES 3 and 4 a horizontal upper guide plate 20 is provided, positioned above the table 10 a distance suitable to accommodate the core panel 40 therebetween, by means not specifically shown. An outer guide member 21 and an inner guide member 22 are attached to the lower side of the guide plate 20, while an outer guide member 23 and an inner guide member 24 are attached to the upper surface of the table 10. Strip 30 slides between the top of table 10 and the under surface of guide plate 20, and is threaded between the outer guide members 21, 23 and the inner guide members 22, 24. The curved path which is followed by the strip 30 is clearly shown in FIGURE 3.

Supply roll 16 is, in actual fact, a great deal larger than is illustrated in the drawings. The initiation of the process is accomplished by pulling the strip 30 from the supply roll 16 around the guide roll 17, thence around the ends of the outer guide members 21, 23, thence along the curved path between the inner and outer guide members, past the welding and stepping apparatus 14, and around the entire circumference of the loop guide 12. The strip 30 is placed in engagement with itself at the preliminary alignment position 60, and as more of the strip is pulled from the supply roll 16, it is also placed in engagement with itself at the final alignment position 70. Operation of the welding and stepping apparatus is initiated to secure the strip to itself to close the loop, and to then step the completed loop around the loop guide 12 and secure successive portions of the unattached strip to the previously formed core loop. The pulling movement on the core loop in the direction indicated by arrow 19 causes the strip 30 as it extends from the supply roll 16 to the preliminary alignment position 60 to be under tensile stress; the advancing action of the honeycomb core panel provides a positive forward drive for the core strip 30 as it enters its curved path between the preliminary alignment position 60 and its final alignment position 70.

In the drawings the outermost core strip layer 42 of the honeycomb panel 40 has outer nodal points which are designated in FIGURE 3, reading from right to left, as $41a$, $41b$, $41c$ . . . $41z$, $41A$, $41E$. In similar fashion the nodal points on the inner edge of the core strip layer 42 are designated $43a$ . . . $43z$, $43A$, $43E$. On core strip 30 the successive nodal points at the outer edge of the core strip, reading from right to left, are designated as $31a$, $31b$ . . . $31z$, $31A$ . . . $31L$; and the nodal points on its inner edge as $33a$ . . . $33z$, $33A$ . . . $33K$. The outwardly facing half-cells formed by the core strip 30 are those which lie between pairs of nodal points on the outer edge of the core strip; while the inwardly facing half-cells are those which lie between nodal points on the inner edge of the strip.

At the preliminary alignment position 60 as shown in FIGURE 3 it will be seen that each outwardly facing half-cell of the core strip 30 is nested within a corresponding outwardly facing half-cell of the strip layer 42. It is this relationship which provides the positive forward drive for the core strip 30, resulting from the forward movement imparted to the honeycomb panel 40 by the welding and stepping apparatus 14. Thus as shown in FIGURE 3 the nodal points $31j$, . . . $31m$, are respectively aligned with nodal points $41e$, . . . $41h$ of the strip 42. However, at final alignment position 70 the nodal points $33F$, $33G$, $33H$, are aligned with nodal points $41z$, $41A$, $41B$ of the strip 42. In other words, at preliminary alignment position 60 the nodal points on the outer edge of the strip 30 are aligned with the nodal points on the outer edge of the strip 42, whereas in the final alignment position 70 the nodal points on the inner edge of the strip 30 are aligned with the nodal points on the outer edge of the strip 42. It is therefore apparent that between the preliminary alignment position 60 and the final alignment position 70 there is a change of one-half cell in the relative longitudinal positions of the strip 30 and the strip 42, which change for purpose of convenience will be referred to as a change in the phase relationship of the two strips.

In order to accomplish the necessary change in phase relationship the curved path followed by the strip 30 in moving between the preliminary alignment position 60 and the final alignment position 70 must be an odd number of half cell-lengths longer than the straight path that is followed by the strip 42. In the specific example shown the difference in path lengths is one and one-half cell lengths. It therefore follows that nodal point $33k$ which at preliminary alignment position 60 engages nodal point $43f$ of strip 42, will when moved to the final alignment position 70 engage the nodal point $41e$ of the strip 42 which is displaced longitudinally one and one-half cell lengths from the nodal point $43f$. It will likewise be seen that nodal point $33F$ which at final alignment position 70 engage nodal point $41c$ was, at the preliminary alignment position, in engagement with the nodal point $43A$ on the inner edge of strip 42.

In the honeycomb core panel 40 the desired cell length is slightly longer than the cell length of the preformed ribbon or core strip 30. The length of the curved path followed by strip 30 in moving between positions 60 and 70 is sufficient to change the phase relationship as described above, and it also accomplishes the stretching of the material of the strip so that the cell length of the strip upon reaching the final alignment position 70 coincides precisely with the cell length of the completed core panel 40. It will be readily apparent, however, that the stretching action to which the core strip is subjected in passing between the preliminary alignment position 60 and the final alignment position 70 is a function only of the length of the path through which it travels, and is not in anywise affected by the amount of tensile stress existing in the core strip portion that extends between the preliminary alignment position 60 and the supply roll 16. Therefore, as the size of the supply roll decreases when the core strip is progressively drawn from it, the stretching action of the strip as it passes beyond the preliminary alignment position and the precision of the final alignment at the final alignment position are not affected thereby.

While direct engagement of strip 30 and panel 40 at the preliminary alignment position is preferred, in lieu thereof it is possible to use a pair of fixed interengaging gear wheels one of which engages panel 40 while the other controls the advancing of strip 30.

The invention has been described in considerable detail in order to comply with the patent laws by providing a full public disclosure of at least one of its forms. However, such detailed description is not intended in any way to limit the broad features or principles of the invention, or the scope of patent monopoly to be granted.

What I claim is:

1. A method of indexing a honeycomb core strip to the edge of a previously formed honeycomb core panel, comprising the steps of:

placing said panel and said strip in a substantially parallel arrangement;

advancing them together in a longitudinal direction;

as a first work location is passed, establishing, by means which engages said panel edge, a preliminary longitudinal alignment of said strip relative to said panel;

changing said preliminary longitudinal alignment by a predetermined amount as a second work location is passed;

and, upon reaching a third work location, moving said strip transversely into engagement with said panel edge in a condition of final longitudinal alignment relative thereto.

2. The method claimed in claim 1 wherein said means which engages said panel edge is said core strip.

3. In the manufacture of honeycomb structures, a method of attaching a preformed ribbon to the outer edge of a honeycomb core panel, comprising the steps of:
- placing a first longitudinal portion of said ribbon in nested engagement with a first portion of said panel outer edge to provide a preliminary alignment of the relative longitudinal position of said ribbon;
- placing a second, longitudinally separated, portion of said ribbon in engagement with a second portion of said panel outer edge;
- placing restricting means on both sides of the intervening portion of said ribbon so as to restrict the same to a path of precisely predetermined length to thereby establish a final longitudinal alignment of said second portion thereof in node-to-node engagement with said second portion of said panel outer edge;
- and thereafter securing together the pairs of adjacent nodes.

4. In the circulating loop method of manufacturing honeycomb structures wherein a transversely corrugated strip is continuously wound upon a previously formed panel loop, is aligned with the corrugations on one side edge of the panel in out-of-phase relationship, and is then secured thereto at the nodal points, a method of alignment control for each successive unsecured strip portion comprising the steps of:
- first guiding said strip portion into a preliminary alignment position in which it engages the outermost strip layer of said panel edge in phase with the corrugations thereof, whereby a longitudinal driving force applied to said panel is imparted therethrough to said strip portion;
- then guiding said strip portion out of engagement with said panel edge;
- and thereafter guiding said strip portion into a final alignment position in which each nodal point on the inner edge thereof is in aligned engagement with a corresponding nodal point on the outer edge of said outermost strip layer.

5. A method of manufacturing honeycomb structures comprising the steps of:
- winding a transversely corrugated strip upon itself to form a loop wherein the second and each succeeding strip layer are in out-of-phase relationship with the respectively preceding strip layers;
- guiding each successive unsecured portion of the strip first into a preliminary alignment position in which it engages the last strip layer of the loop in phase with the corrugations thereof, then out of engagement with the loop, and thereafter again into engagement with the loop in a final alignment position in which each nodal point on the inner edge of the still unsecured strip portion is aligned with a corresponding nodal point on the outer edge of said last strip layer of the loop;
- and securing the aligned pairs of nodal points together when said final alignment position has been reached.

6. A method of winding a strip, having uniformly longitudinally spaced transverse corrugations capable of nesting engagement, upon itself in a continuous loop in which successive layers of the strip are secured to each other but not in the nested position of the respective corrugations thereof, comprising guiding an unsecured portion of the strip first into and then out of nested engagement with the previously wound strip, thereafter guiding said unsecured strip portion into the desired longitudinal alignment position relative to said previously wound strip, and final securing said strip portion to said previously wound strip.

7. A method of indexing a honeycomb core strip to a previously formed core panel, comprising the steps of:
- pulling the core strip under tension from a supply source;
- guiding successive unattached portions of the core strip into nested relationship with the outermost core strip layer of the panel, thereby precisely establishing the relative longitudinal positions thereof and shielding the subsequent longitudinal stretching action of each said unattached portion from being affected by the load imposed by said supply source;
- thereafter guiding each said unattached portion first out of engagement with said outermost core strip layer, and then stretching it and simultaneously bringing it again into engagement with said outermost core strip layer in a position of final longitudinal alignment therewith;
- and, after said position of final alignment has been reached, securing said core strips together at their adjacent nodal points.

8. A method of indexing a honeycomb core strip having transverse corrugations which provide a continuous series of alternately oppositely facing half-cells of substantially uniform cell length, to a previously formed core panel, comprising the steps of:
- guiding the core strip into a preliminary alignment position wherein the outwardly facing half-cells of the strip are nested within corresponding outwardly facing half-cells of the outermost core strip layer of the panel;
- moving said panel relative to both the source of supply of the core strip and said preliminary alignment position thereby placing the core strip portion which extends between said preliminary alignment position and said source of supply under tension;
- as said panel is moved and the core strip is propelled forwardly from said preliminary alignment position, guiding the core strip out of engagement with said panel along a curved path of predetermined length and back into engagement with said panel at a final alignment position;
- the length of said curved path being such that in said final alignment position each inwardly facing half-cell of the core strip cooperates with a corresponding outwardly facing half-cell of said outermost core strip layer of said panel to form a complete cell;
- and thereafter attaching the core strip to said outermost core strip layer;
- the action being such that the longitudinal stress condition of the portion of the core strip occupying said curved path is independent of the tensile stress condition existing in the portion of the core strip between said preliminary alignment position and said source of supply.

9. Apparatus for manufacturing honeycomb core panels comprising, in combination:
- means for holding and advancing a previously formed core panel;
- means for bringing a preformed corrugated core strip into nesting engagement with the outer core strip layer of said panel at a preliminary alignment position;
- means for guiding said core strip out of engagement with said panel at a succeeding work position;
- and means for guiding said core strip again into engagement with said panel at a final alignment work position, with the inner nodal points on said core strip engaging the outer nodal points on the outer core strip layer of said panel.

References Cited by the Examiner

UNITED STATES PATENTS

| | | | |
|---|---|---|---|
| 2,843,722 | 7/1958 | Wegeforth | 219—80 |
| 2,947,077 | 8/1960 | Lazarus | 29—430 |

WHITMORE A. WILTZ, *Primary Examiner.*